United States Patent
Tione

(10) Patent No.: US 11,834,083 B2
(45) Date of Patent: Dec. 5, 2023

(54) SYSTEM AND METHOD FOR CALCULATING ADVANCE SPEED OF A VEHICLE

(71) Applicant: FAIVELEY TRANSPORT ITALIA S.P.A., Piossasco (IT)

(72) Inventor: Roberto Tione, Lauriano (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 396 days.

(21) Appl. No.: 17/077,015

(22) Filed: Oct. 22, 2020

(65) Prior Publication Data

US 2021/0039691 A1 Feb. 11, 2021

Related U.S. Application Data

(63) Continuation-in-part of application No. 16/088,107, filed as application No. PCT/IB2017/051902 on Apr. 4, 2017, now abandoned.

(30) Foreign Application Priority Data

Apr. 5, 2016 (IT) .................. 102016000034579

(51) Int. Cl.
  *B61L 25/02* (2006.01)
  *B61L 3/00* (2006.01)
  *B61H 9/00* (2006.01)

(52) U.S. Cl.
  CPC ............ *B61L 25/021* (2013.01); *B61H 9/006* (2013.01); *B61L 3/008* (2013.01)

(58) Field of Classification Search
  CPC .. B61L 25/021; B61L 3/008; B61L 3/10–108; B60L 3/10–108; B61C 15/00; H03H 21/00; B61H 9/006

(Continued)

(56) References Cited

U.S. PATENT DOCUMENTS 4,078,845 A * 3/1978 Amberg ................ B60T 8/1703
  244/111
4,794,538 A * 12/1988 Cao ...................... B60T 8/17636
  303/166

(Continued)

FOREIGN PATENT DOCUMENTS

KR 20130003555 A * 1/2013 ............. G05B 13/02

OTHER PUBLICATIONS

M. Ahmed, N. Lachhab and F. Svaricek, "Non-model based adaptive control of electro-hydraulic servo systems using prefilter inversion," International Multi-Conference on Systems, Signals & Devices, 2012, pp. 1-6, doi: 10.1109/SSD.2012.6197984. (Year: 2012).*

(Continued)

*Primary Examiner* — Jeffrey C Boomer
*Assistant Examiner* — Paul Allen
(74) *Attorney, Agent, or Firm* — THE SMALL PATENT LAW GROUP LLC; Philip S. Hof

(57) ABSTRACT

A method includes estimating, as a function of an angular speed of wheels of an axle of a vehicle, a value of adhesion of a contact area of the wheels of said axle to a route, and calculating a value of slip of the wheels of said axle. The method also includes generating signals representative of a derivative of said adhesion as a function of the slip of the wheels of said axle, and calculating an error signal as a difference between a value of said derivative and a predetermined reference value. The method includes generating, via an adaptive filter that implements a Least Mean Square (LMS) algorithm, a driving signal based on said derivative. The LMS algorithm is continuously adapted based on the error signal to reduce and keep the error signal substantially at zero. The method includes applying said driving signal to a torque control module.

14 Claims, 7 Drawing Sheets

(58) Field of Classification Search
USPC .......................................... 701/19–20, 70–89
See application file for complete search history.

(56) References Cited

U.S. PATENT DOCUMENTS

| | | | | |
|---|---|---|---|---|
| 4,862,368 | A * | 8/1989 | Kost | B60T 8/17636 |
| | | | | 701/70 |
| 5,135,290 | A * | 8/1992 | Cao | B60T 8/17616 |
| | | | | 180/197 |
| 5,394,071 | A * | 2/1995 | Thoen | G05B 13/042 |
| | | | | 318/632 |
| 6,208,097 | B1 * | 3/2001 | Reddy | B60L 3/10 |
| | | | | 318/52 |
| 2005/0065701 | A1 * | 3/2005 | Kumar | B61C 15/14 |
| | | | | 701/19 |
| 2010/0114449 | A1 * | 5/2010 | Shiozawa | B62D 6/005 |
| | | | | 701/90 |
| 2012/0330485 | A1 * | 12/2012 | Tamagawa | B60W 30/20 |
| | | | | 903/903 |

OTHER PUBLICATIONS

S. Sadr, D. A. Khaburi and J. Rodríguez, "Predictive Slip Control for Electrical Trains," in IEEE Transactions on Industrial Electronics, vol. 63, No. 6, pp. 3446-3457, Jun. 2016. (Year: 2016).*

Yang Ki Il—English Description of KR-20130003555-A via Espacenet Patent Translate, retrieved Dec. 7, 2022. (Year: 2022).*

\* cited by examiner

SYSTEM AND METHOD FOR CALCULATING ADVANCE SPEED OF A VEHICLE

CROSS-REFERENCE TO RELATED APPLICATIONS

This application is a continuation-in-part of U.S. application Ser. No. 16/088,107 (the "'107 Application"), entitled "Method for Calculating the Advance Speed of a Railway Vehicle," filed 25 Sep. 2018. The '107 Application is a U.S. National Stage Application of International Patent Application No. PCT/IB2017/051902, filed 4 Apr. 2017, which claims priority to Italian Patent Application No. 102016000034579, filed 5 Apr. 2016. All three applications are incorporated herein by reference in their entirety.

BACKGROUND

Technical Field

The present inventive subject matter relates to a process for improving the computation of the advance speed of a vehicle, such as a railway vehicle, when axles of the vehicle are in a slipping phase due to degraded conditions of adhesion on the route, such as rails.

Discussion of Art

The most precise knowledge of the advance speed of a railway vehicle is of particular importance for example for driving control systems, such as anti-skid systems, and for odometrical references installed on board.

A known method for accurately determining the speed of a railway vehicle is to maintain a "dead" axle, not subjected to traction or braking torques, so that the measurement of its speed is the best reproduction of the actual speed of said vehicle. This solution is particularly effective in the case of particularly low adhesion between the wheels and the rail, when, during traction or braking, all the wheels may enter into a slipping condition and therefore not be in a position to provide correct information regarding the actual speed of the vehicle. In this case, a "dead" axle not subjected to traction or braking torques could continue to be a reliable indicator of the vehicle speed.

The modern architectures of railway vehicles, especially in the case of subway vehicles, tend to have very limited compositions, e.g. they are made up of only two carriages. In such a case, maintaining a "dead" axle could lead to a significant loss of the train's traction and braking capacity. FIG. 9A of the accompanying drawings shows a composition with two independent cars, and FIG. 9B shows a composition with two cars secured through a Jacobs bogie: it is evident how the use of a "dead" axle reduces the traction and braking capacity by 12.5% in the first case and by 16.7% in the second case.

It may be desirable to fully recover the use of the "dead" axle for the purposes of traction and braking, even in the case of particularly reduced adhesion, thereby increasing the traction and braking capacity of the train, while permitting said axle to accurately track the speed of the train for a precise assessment of the advance speed.

BRIEF DESCRIPTION

In one or more embodiments, a method is provided for calculating or estimating a speed of a vehicle. The method includes generating speed signals indicating an angular speed ($\omega$) of wheels of an axle of the vehicle. The method also includes estimating, via a control system that includes one or more processors, as a function of said angular speed ($\omega$), a value of adhesion ($\mu$) of a contact area of the wheels of said axle to a route, and calculating a value of slip ($\delta$) of the wheels of said axle. The method includes generating signals representative of a derivative ($d\mu/d\delta$) of said adhesion ($\mu$) as a function of the slip ($\delta$) of the wheels of said axle, and calculating an error signal ($e(T_{j+1})$) as a difference between a value of said derivative ($d\mu/d\delta$) and a predetermined reference value. The method includes generating, via an adaptive filter that implements a Least Mean Square (LMS) algorithm, a driving signal ($C(T_{j+1})$) based on said derivative ($d\mu/d\delta$). The LMS algorithm is continuously adapted based on the error signal to reduce and keep the error signal substantially at zero. The method also includes applying said driving signal ($C(T_{j+1})$) to a torque control module to control a torque exerted on said axle or the wheels of said axle.

In one or more embodiments, a method for calculating or estimating a speed of a vehicle is provided. The method includes generating speed signals indicating an angular speed of wheels of an axle of the vehicle. The method includes estimating, via a control system that includes one or more processors, as a function of said angular speed, a value of adhesion of a contact area of the wheels of said axle to a route, and calculating a value of slip of the wheels of said axle. The method also includes generating signals representative of a derivative of said adhesion as a function of the slip of the wheels of said axle, and calculating an error signal as a difference between a value of said derivative and a predetermined reference value. The method includes generating, via an adaptive filter that implements a Least Mean Square (LMS) algorithm, a driving signal based on said derivative. The LMS algorithm is continuously adapted based on the error signal to reduce and keep the error signal substantially at zero. The method includes applying said driving signal to a torque control module to control a torque exerted on said axle or the wheels of said axle.

In one or more embodiments, a control system is provided that includes a control circuit including one or more processors. The control circuit is configured to receive speed signals indicating an angular speed of wheels of an axle of a vehicle. The control circuit is configured to estimate, as a function of said angular speed, a value of adhesion of a contact area of the wheels of said axle to a route, and calculate a value of slip of the wheels of said axle. The control circuit is also configured to generate signals representative of a derivative of said adhesion as a function of the slip of the wheels of said axle, and to calculate an error signal as a difference between a value of said derivative and a predetermined reference value. The control circuit includes an adaptive filter that implements a Least Mean Square (LMS) algorithm. The adaptive filter is configured to generate a driving signal based on said derivative. The LMS algorithm is continuously adapted based on the error signal to reduce and keep the error signal substantially at zero. The control circuit is further configured to control a torque exerted on said axle or the wheels of said axle based on said driving signal.

BRIEF DESCRIPTION OF THE DRAWINGS

The inventive subject matter may be understood from reading the following description of non-limiting embodiments, with reference to the attached drawings, wherein below.

DETAILED DESCRIPTION

Certain embodiments of the inventive subject matter relate to the specific case of braking implemented by means of an anti-slip system. Those skilled in the art may however easily deduce a way to implement the present invention through an independent system. Also, those skilled in the art may deduce the dual application, relating to the case of traction, to which the subsequent claims of the present application refer.

Various examples described herein refer to rail or railway vehicles (e.g., trains), which travel on rails of tracks. For example, a vehicle referred to herein may be a locomotive, and a route referred to herein may include rails on which wheels of the locomotive roll. The embodiments described herein are not limited to rail-based vehicles. For example, the vehicle may be an automobile, a truck (e.g., highway semi-truck, mining truck, logging truck, or the like), a motorcycle, or the like, and the route may be a road or path.

Electronic systems are installed onboard most modern rail vehicles, which typically include wheel slide control subsystems, intended to intervene both when the vehicle is in the traction phase and when it is in the braking phase. These subsystems are known as anti-skid or anti-slide systems, or also WSP (Wheel Slide Protection) systems.

Figure 1:
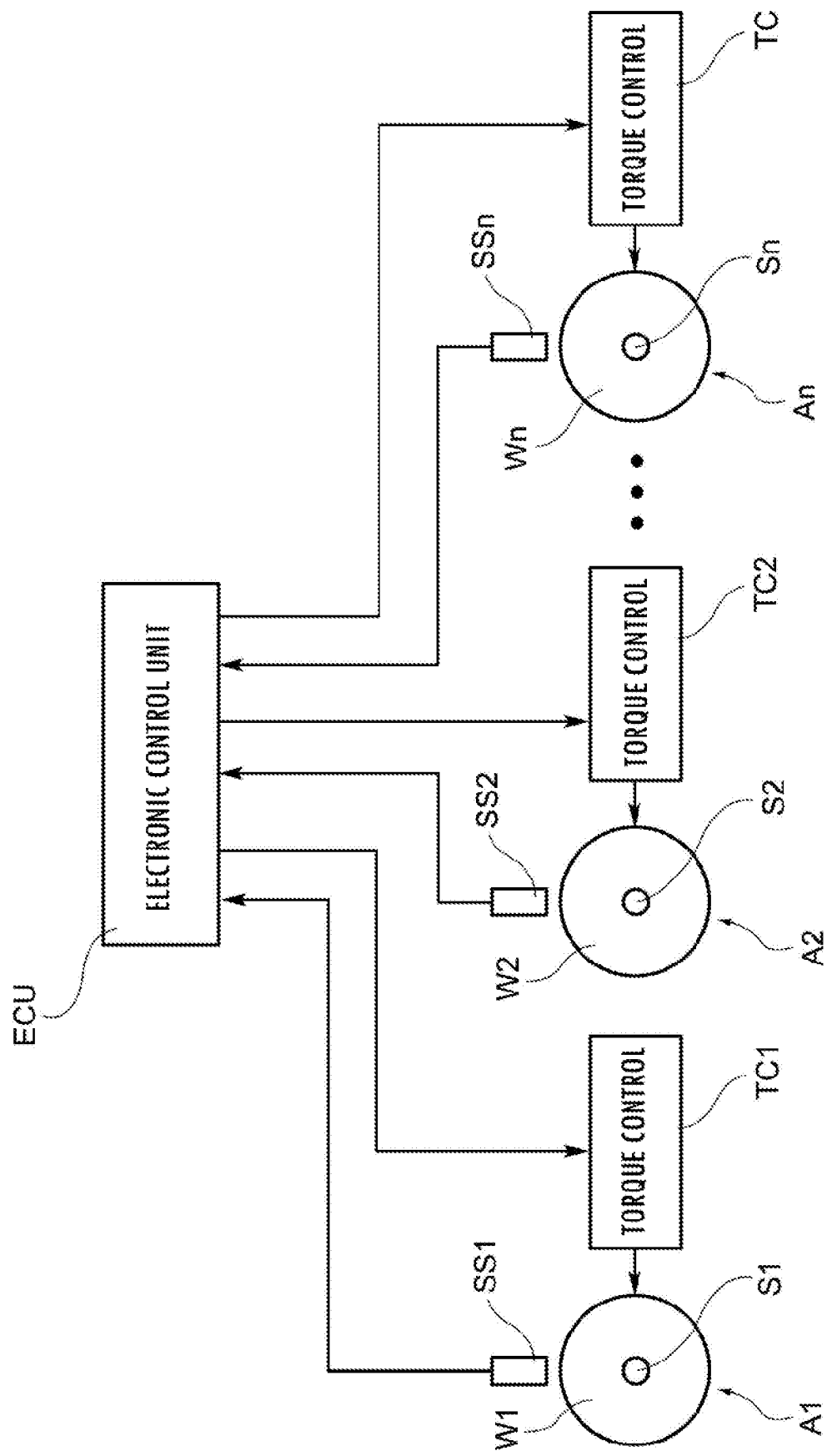
FIG. 1 is a block diagram of an anti-skid control system of the wheels of a railway vehicle.

A system for controlling the adhesion of the wheels, as an anti-skid function, according to the prior art, is schematically represented in FIG. 1 of the accompanying drawings, which refers to a vehicle with n controlled axles A1, A2, . . . , An. The axles A1, A2, . . . , An comprise a respective shaft S1, S2, . . . , Sn and a respective wheelset W1, W2, . . . , Wn integral in rotation to it.

In the drawings, only one wheel of each axle is generally illustrated.

The WSP system of FIG. 1 comprises an electronic control unit ECU, typically based on microprocessor architecture, that receives tachometer signals relating to the angular speed of each axle A1, A2, . . . , An from sensors SS1, SS2, . . . , SSn respectively associated to these axles. The electronic control unit ECU is also connected to the torque control apparatuses TC1, TC2, . . . , TCn, each associated to a respective axle A1, A2, . . . , An.

The electronic control unit ECU is provided to operate a modulation of the torque applied to each axle according to a predetermined algorithm if, in the case of applying torque during traction or braking in a degraded adhesion condition, the wheels of one or more axles end up in a possible incipient skidding condition. Torque modulation is implemented in such a way as to prevent a total locking of the axles, possibly so as to bring each axle into a condition of controlled slipping with the intention of recovering adhesion and in any case for the entire duration of the degraded adhesion condition.

Figure 2:
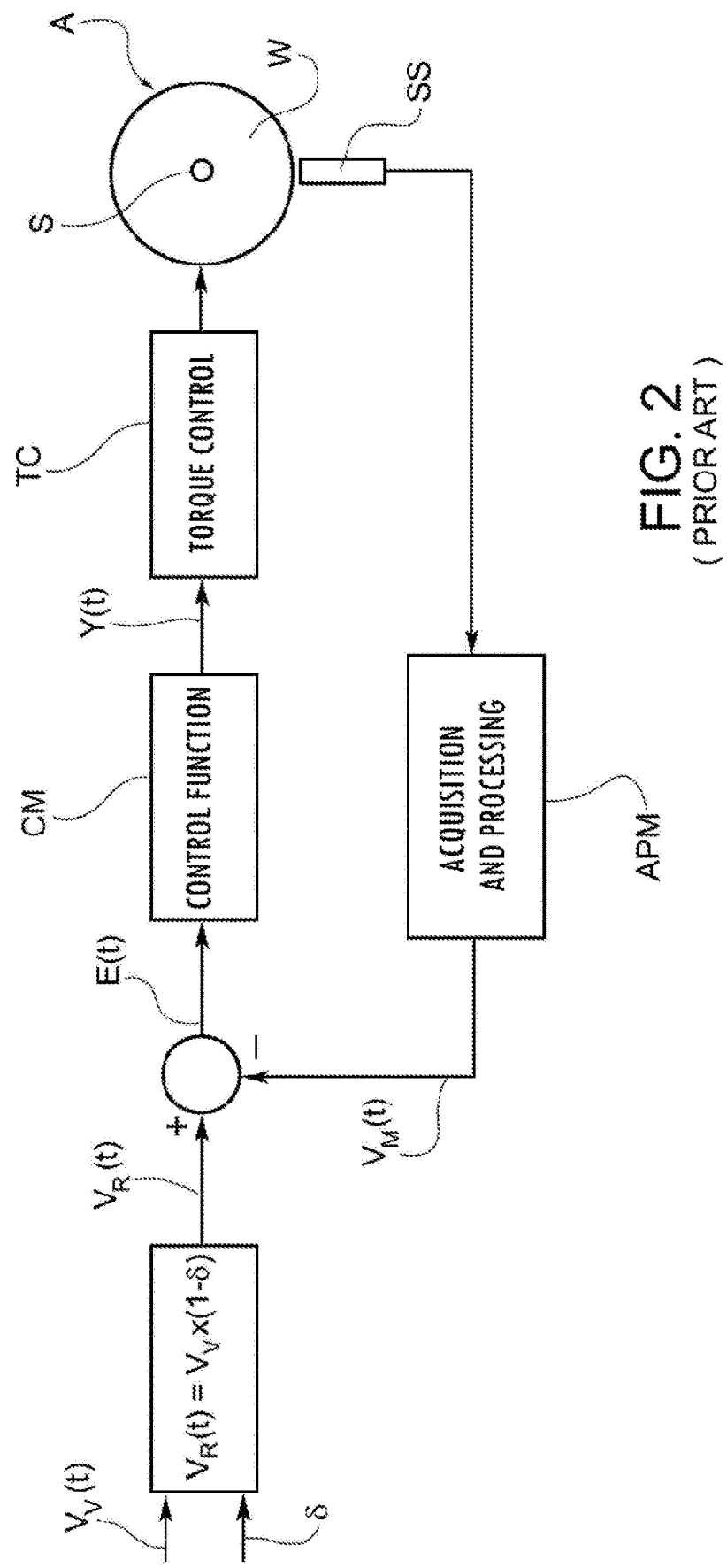
FIG. 2 is a block diagram of a closed loop control system of an axle's rotation speed.

FIG. 2 shows a block diagram illustrating an adhesion control/recovery system for a generic axle: the error or difference E(t) between the reference speed value $V_R(t)$ at which one wishes to slide the controlled axle A and the measured speed $V_M(t)$ detected by the associated sensor SS and conditioned by an acquisition and processing module APM is applied as an input signal to a control module CM, which outputs a drive signal Y(t) to the torque control apparatus TC associated with the axle A.

The reference speed $V_R(t)$ is obtained as a fraction of the instantaneous speed of the vehicle, for example, according to the expression:

$$V_R(t) = V_v(t) \cdot (1-\delta) \qquad (1)$$

where $V_v(t)$ is the instantaneous (computed) speed of the vehicle, and δ represents the related slip of the axle A to be obtained during the skidding phase.

It is evident how the knowledge of the vehicle's instantaneous speed $V_v(t)$ is essential for properly controlling skidding.

In the event of braking, the algorithm most used for the estimation of the vehicle's actual speed $V_v(t)$ normally uses a function of the type:

$$V_v(T_j) = \max[S_1(T_j), \ldots, S_n(T_j), (V_v(T_{j-1}) + a_{max} \cdot T)] \qquad (2)$$

while in the event of traction, the following function is used:

$$V_v(T_j) = \min[S_1(T_j), \ldots, S_n(T_j), (V_v(T_{j-1}) + a_{max} \cdot T)] \qquad (3)$$

where $a_{max}$ is the maximum acceleration permitted for the vehicle m operation, this acceleration having a positive sign in the case of a traction condition and a negative sign in the case of a braking condition.

The contribution $(V_v(T_{j-1}) + a_{max} \cdot T)$ in the relationships or expressions (2) and (3) serves to contain the variation of the $V_v(t)$ within physical limits allowed by the train, when excessive instantaneous and concurrent variations of the speeds of the axles due to particularly degraded adhesion conditions, in traction or braking conditions, could lead to a loss of significance of the speed $V_v(t)$ computed with these expressions (2) and (3).

More accurate variants of the expressions (2) and (3) are known but still based on the instantaneous measurement of the individual speed of the axles. It becomes evident here how the availability of a "dead" axle would make expressions (2) and (3) very accurate if all the axles were subjected to torque during skidding phase.

A torque control module or apparatus TC controls the torque applied to at least one associated axle. By way of non-limiting example, one possible embodiment of the torque control apparatus TC is described and illustrated in the previous Italian patent application No. 102015000086465 filed Dec. 22, 2015. The torque control apparatus may be made according to many variants known to persons skilled in the art.

Figure 3:
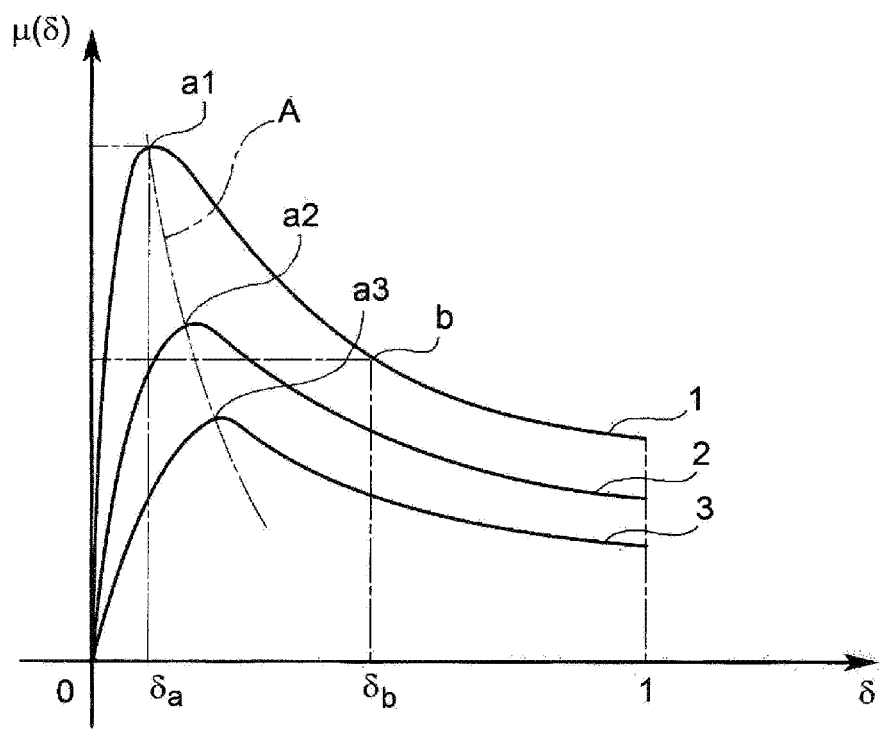
FIG. 3 is a graph showing qualitatively the trend of the adhesion coefficient of the wheels of an axle, shown on the y-axis, as a function of the slip δ, shown on the x-axis.

As is well known, the adhesion coefficient μ between wheels and rails varies according to the slip δ substantially in the way illustrated in FIG. 3. Based on the expression (1) above, slip δ may be expressed as with $0 \leq V_r \leq V_v$ and $0 \leq \delta \leq 1$.

$$\delta = \frac{Vv - Vr}{Vv} \quad (4)$$

In FIG. 3, the curves 1, 2 and 3 qualitatively represent the trend of the adhesion according to the environmental conditions: curve 1 corresponds to an adhesion condition in dry contact conditions between the wheels and rails, curve 2 corresponds to an adhesion condition in the presence of moisture between the wheels and rails, and curve 3 represents an adhesion condition in the presence of viscous material between the wheels and rails, such as oil or rotten leaves (typical condition in the autumn period), or even rust mixed with moisture (typical condition in railway depots).

It has been found experimentally that the values of slip δ at the adhesion peaks $a_1$, $a_2$, $a_3$ vary with the change in the adhesion conditions, which move along a curve as indicated at A in FIG. 3.

Experimental measurements demonstrate how the curve A lies in an area corresponding to values $0 \leq \delta \leq 0.02$ even in very degraded adhesion conditions.

If one or more axles, for example the one previously defined as the "dead" axle, can be maintained on the curve A during traction or braking, it achieves the dual effect of using, for said axles, the maximum available adhesion and at the same time tracking the actual speed of the train, corresponding to δ=0, with a maximum error of 2%.

Figure 4:
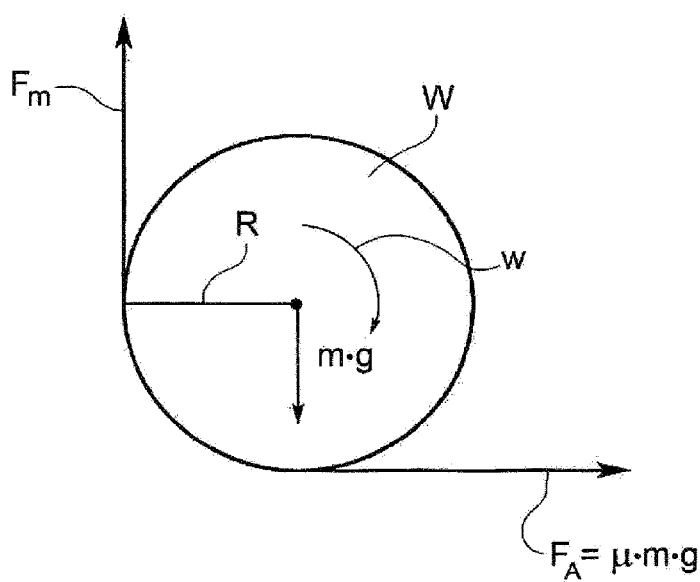
FIG. 4 is a diagram illustrating the forces applied to an axle's wheel.

FIG. 4 is a diagram illustrating forces applied to an axle's wheel W. From this figure, it is clear that:

$$F_m \cdot R = F_A R - J \cdot \omega \quad (5)$$

where:

$$F_A = \mu \cdot m \cdot g \quad (6)$$

for which:

$$F_m = \mu \cdot m \cdot g - J/R \cdot \omega \quad (7)$$

where $F_m$ is the tangential force applied to a wheel by the traction and/or braking system, R is the radius of the wheel, J is the moment of inertia of the axle, m is the mass applied to the wheel-rail contact area, and ω is the instantaneous angular acceleration of the axle.

It is clear that at the same instantaneous angular acceleration, the maximum applicable force $F_m$ is obtained in correspondence with the maximum value of adhesion μ, i.e. at the points lying on the curve A of FIG. 3.

The method according to one or more embodiments uses an adhesion observer to evaluate in real time the adhesion value μ at the contact area between the wheels and rails for one or more axles during a skidding phase and, by processing these μ values in real time, identifies continuously over time the δ value to be assigned to a slip control system.

The adhesion observer is adapted to dynamically identify the instantaneous value $\mu(T_j)$ of the adhesion in a generic sampling period $T_j$ of a predetermined duration T at the wheel-rail contact area during skidding. The instantaneous value $\mu(T_j)$ of the adhesion is definable using the equation (7) from which with some simple steps the following expression is obtained:

$$\mu(T_j) = \frac{1}{m \cdot g} \cdot [F_m(T_j) + J/R \cdot \omega(T_j)] \quad (8)$$

The variable ω in expression (8) is the angular acceleration of the axle, i.e., the time derivative of the angular speed of the axle. The value of this acceleration is already available in real time within a control and adhesion recovery system, because angular acceleration is one of the variables on which the control function implemented by the block CM of FIG. 2 is normally based for controlling the slip of the axle. The sign of ω depends on the instantaneous acceleration or deceleration condition of the axle.

The variable m in expression (8) is the mass on the wheel-rail contact area. The m value may be monitored in real time, as it is commonly available to the system that computes the accelerating/braking force to apply to the axle to obtain the desired accelerations/decelerations.

The variable J in expression (8) is the moment of inertia of the axle and is a parameter whose value is always known. The value of the parameter may be supplied by the manufacturer of the vehicle, as it is fundamental for the computation of stopping distances;

The variable $F_m$ in expression (8) is already defined above in relation to FIG. 4. The force $F_m$ can be obtained by multiplying the pressure applied to the brake cylinder, known to the braking system, for pressure/force conversion coefficients typical of the brake cylinder, as well as the transmission and efficiency coefficients of the levers and of the friction coefficient between the brake linings and discs (in the case of disc brakes). In the case of electrodynamic-type traction or braking, the value of the force $F_m$ may be obtained from the electric current value supplied/regenerated by the motor in traction or, respectively, in braking. In the case of so-called "blended" braking, the intensity of the force $F_m$ may be determined as the sum of the respective contributions of the pneumatic brake and of the electrodynamic brake, appropriately weighed with respective coefficients.

The variable $T_j$ is the generic j-th sampling period of the system with which the adhesion observer (and more generally the method according to one or more embodiments) is carried out. In the description that follows, $T_j$ will replace the use of the variable t representing time.

Downstream of the adhesion observer, a low-pass type filter may appropriately be provided, to remove or at least mitigate instantaneous and noise variations present outside of the frequency band useful for a correct observation of the adhesion values.

Figure 6:
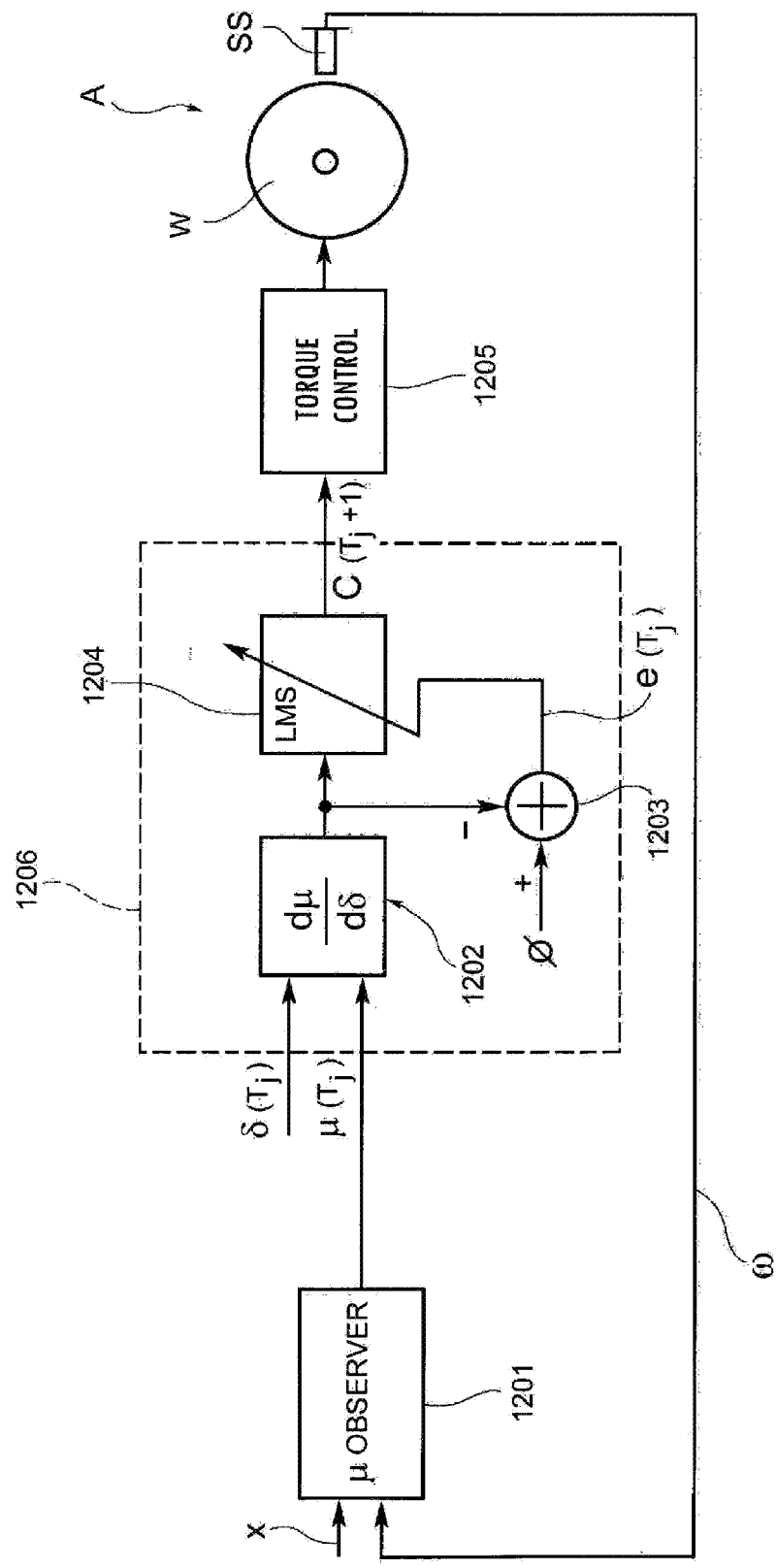
FIG. 6 is a block diagram relating to a system for the implementation of the method according to one or more embodiments of the inventive subject matter.

An embodiment of a system (e.g., a vehicle control system) for implementing a method according to an embodiment is illustrated in FIG. 6. The system includes a control circuit. The control circuit represents hardware circuitry that includes and/or is connected with one or more processors (e.g., one or more microprocessors, integrated circuits, microcontrollers, field programmable gate arrays, etc.). The control circuit includes and/or is connected with a tangible and non-transitory computer-readable storage medium (e.g., memory). For example, the memory may store programmed instructions (e.g., software) that is executed by the one or more processors to perform the operations of the control device described herein. The memory additionally or alternatively may store different information, such as received data parameters and calculated data values. In the illustrated embodiments, the control circuit is characterized by multiple interconnected modules, including a adhesion observer module 1201, a derivative module 1202, an adder module 1203, an adaptive filter 1204, and a torque control module 1205. Each of the modules 1201-1205 may be software-based such that the respective module 1201-1205 includes or represents one or more software instructions comprised in a computer program that are adapted to be executed, for example by the one or more processors, to achieve a predetermined function or output. The modules 1201-1305 may communicate with each other by generating and receiving electrical signals, as described herein.

Figure 5B:
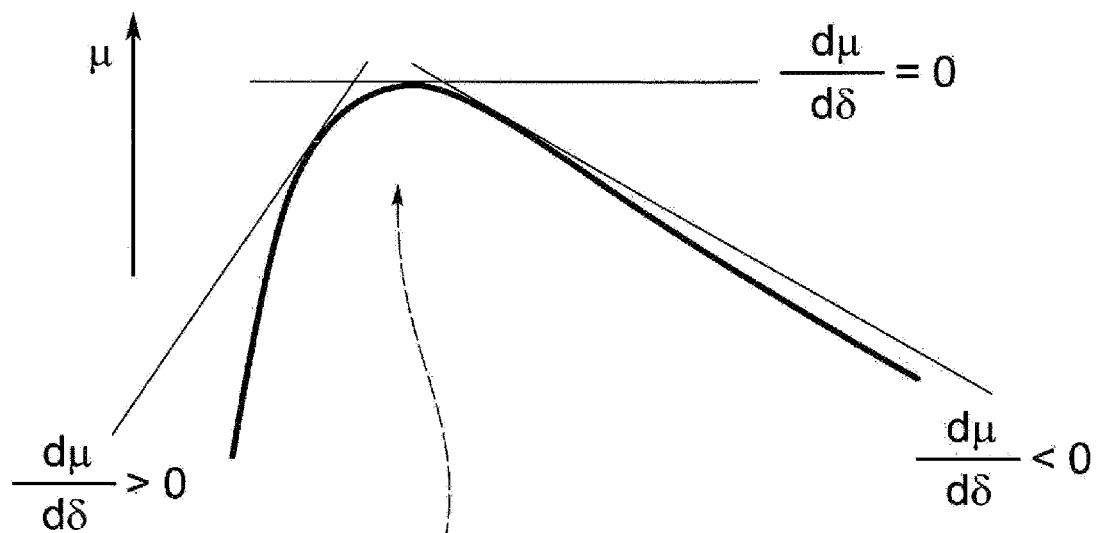
FIG. 5B is another graph to illustrate the control criterion to which the present invention refers, and the graph in FIG. 5B shows in enlarged scale a part of the graph of FIG. 5A.
Figure 5A:
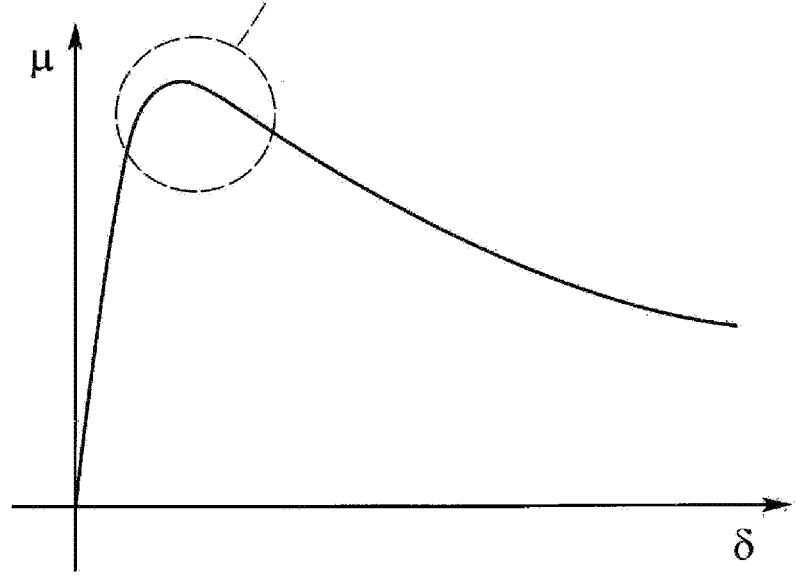
FIG. 5A is a graph to illustrate the control criterion to which the present invention refers.

The method provides for identifying and tracking the slip value δ of at least one axle, such that the curve μ(δ) illustrated in FIG. 5 shows the maximum value, i.e. the δ value for which $$\frac{d\mu(T)}{d\delta(T)} = 0.$$

For this purpose, the vehicle control system according to an embodiment implements an LMS algorithm (Least Mean Square). For an accurate description of the general features of the convergence criteria and the implementation variants of LMS algorithms, please refer to the available literature and in particular to the text: B. Widrow, S. D. Steams, "Adaptive Signal Processing," New Jersey, Prentice-Hall, Inc., 1985.

With reference to FIG. 6, the adhesion observer module 1201 receives input signals representative of the value of the speed ω of the wheel of a controlled axle An of the vehicle that is to be maintained on the adhesion peak, together with an X vector containing the values of the magnitudes m($T_i$), J, R, and $F_m(T_j)$ previously described. The signal representing the speed of the wheel may be received from a speed sensor SS configured to monitor wheel speed. Based on the received input signals and known data (e.g., data previously stored in the memory), the adhesion observer module 1201 estimates the instantaneous value of adhesion μ($T_j$) relating to the controlled axle.

The output of the adhesion observer 1201 is connected to the input of the derivative module 1202 of the control circuit. The derivative module 1202 computes the value of the derivative $$\frac{d\mu}{d\delta}$$

e.g., according to the equation:

$$\frac{d\mu(T_j)}{d\delta(T_j)} = \frac{\mu(T_j) - \mu(T_{j-1})}{\delta(T_j) - \delta(T_{j-1})}. \quad (9)$$

The value of δ is obtained by the derivative module 1202 in real time, based on the reference and instantaneous speeds of the vehicle, in accordance with the equation (4). The derivative module 1202 generates signals representative of the derivative which are received by the adder module 1203.

The adder module 1203 calculates an error signal e($T_j$) representative of the difference between a predetermined reference value (or desired value) of the derivative (e.g., the value 0 in a non-limiting example) and the instantaneous value of the derivative computed by the derivative module 1202. The error value is used to adapt the LMS algorithm implemented in the adaptive filter 1204.

The adaptive filter 1204 generates a torque request or driving signal C($T_{j+1}$) for said axle based on the derivative value. In a manner known per se, the adaptive filter 1204 inputs the derivative value into the LMS algorithm to continuously correct or modify the output driving signal C($T_{j+1}$) in order to minimize or nullify the error e($T_j$), i.e. in order to obtain a nullification of the aforementioned derivative, i.e. in order to bring and maintain said controlled axle to the adhesion peak value. The adaptive filter, or at least the LMS algorithm thereof, is continuously adapted based on the error signal. The LMS algorithm changes based on the error signal, so identical derivative values input into the LMS algorithm at two different times may produce two different output driving signals. The LMS algorithm is continuously adapted to reduce and keep the error signal substantially at zero, or a non-zero predetermined reference value.

The driving signal or torque request signal is applied to the torque control module 1205 of a per se known type, having for example the architecture described in the previous aforementioned Italian patent application 102015000086465 with reference to FIG. 3. The torque control module 1205 is configured for controlling the torque exerted on the controlled axle, or the wheels coupled to the axle, according to the driving signal. The torque can be exerted on the axle or wheels by a friction brake assembly, such as a brake pad, pneumatic actuator, and the like, or a via a traction motor mechanically coupled to the axle. The torque control module 1205 may generate a control signal, based on the received driving signal, that causes the friction brake device to increase or decrease the friction force exerted on the wheels of the axle. In another example, the control signal from the module 1205 may be communicated to a traction motor to mechanically increase tractive effort of the axle or reduce tractive effort of the axle. The movement of the vehicle along the route is controlled at least in part by the control signal generated by the torque control module 1205.

By applying, therefore, the solution according to FIG. 6 to at least one axle, said axle will always advance at a linear speed equal to that of the vehicle (less than a maximum error that can be estimated within 2%), even in degraded adhesion conditions, at the same time providing the maximum force value, in traction or braking, made possible by the available adhesion. As such, the control circuit may compute the speed of the vehicle as the linear speed at which said axle advances.

Figure 7:
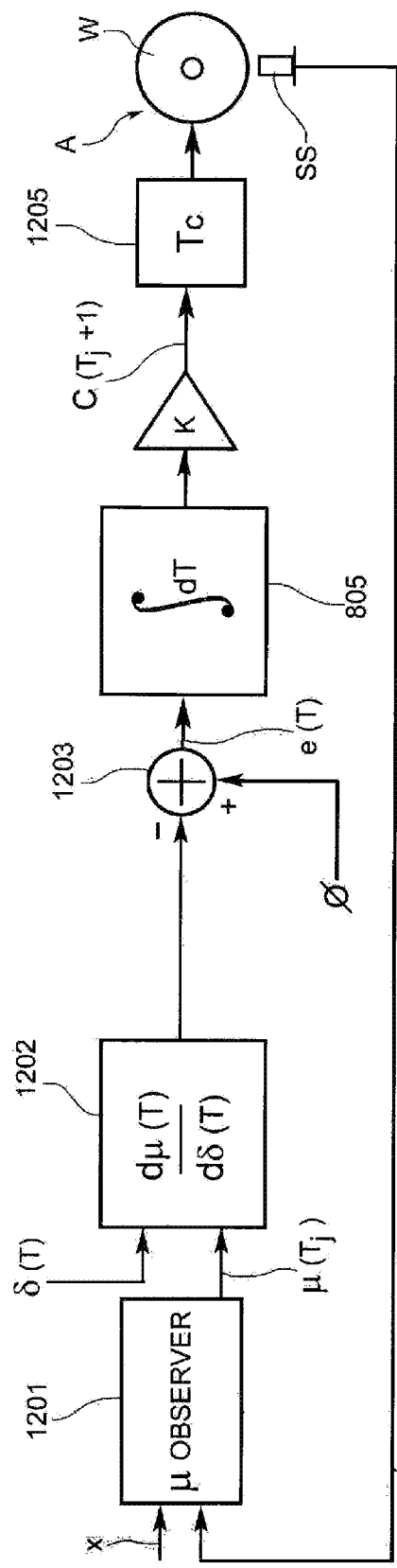
FIG. 7 is a block diagram relating to another system for the implementation of the method according to one or more embodiments of the inventive subject matter.

A simplified implementation of the group of modules included in the dashed line block 1206 of FIG. 6 is illustrated in FIG. 7, where the block 1204, which implements the LMS algorithm, is replaced with a simple integrator 805, the output of which, amplified with a gain K, generates the torque value C($T_{j+1}$) to be assigned to the adhesion control and recovery system 1205. In such case, when $$\frac{d\mu}{d\delta} > 0$$

the integrator 805 increases the torque value C($T_{j+1}$). When $$\frac{d\mu}{d\delta} < 0$$

the integrator 805 decreases the torque value $C(T_{j+1})$. When $$\frac{d\mu}{d\delta} = 0$$

the integrator 805 keeps the torque value $C(T_{j+1})$ stable.

In this way, the system brings and maintains said controlled axle to the peak adhesion value.

The gain K regulates the identification speed of the average adhesion peak value μ and simultaneously ensures the stability of the closed loop system.

Figure 8:
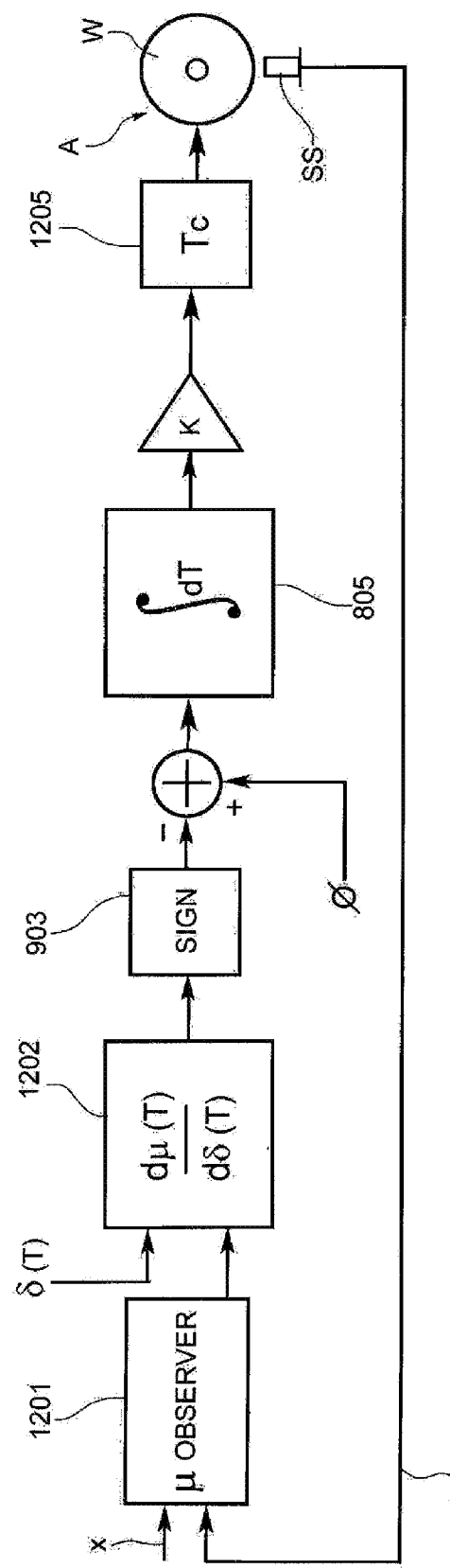
FIG. 8 is a block diagram relating to yet another system for the implementation of the method according to one or more embodiments of the inventive subject matter.
Figure 9A:
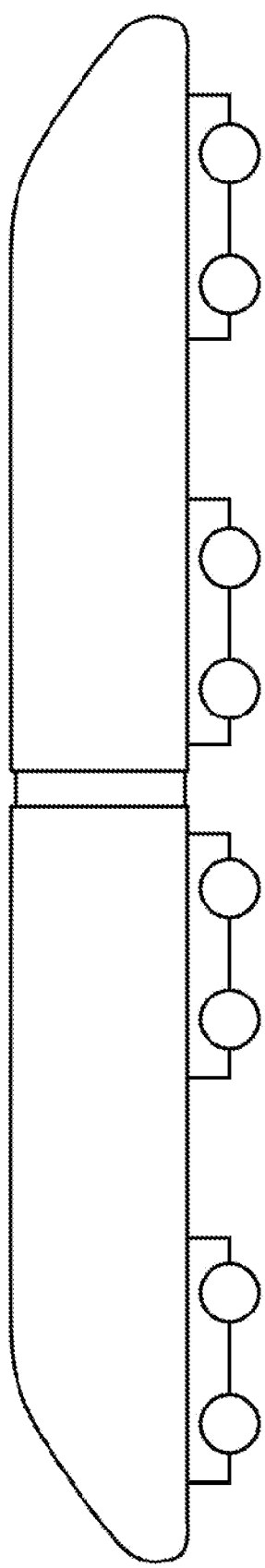
FIG. 9A illustrates a train with two independent cars.
Figure 9B:
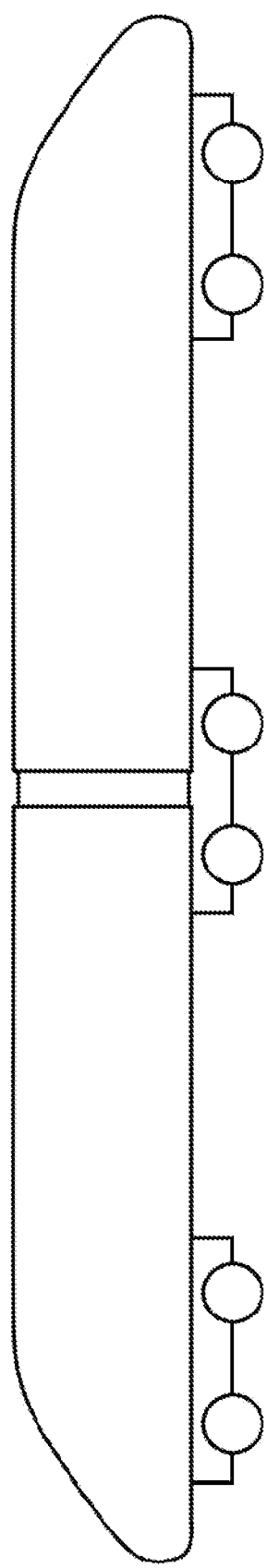
FIG. 9B illustrates a train with two cars bound with a Jacobs bogie.

A further simplified variant of embodiment of the dashed block 1206 of FIG. 6 is shown in FIG. 8. The module 903 determines the sign of the derivative $$\frac{d\mu}{d\delta}.$$

The output of the block 903 being equal to +1 or −1 (positive and, respectively, negative sign), a subsequent integrator 805 performs simple unitary sums.

The integrator 805 may be replaced with an up/down type counter updated with period $T=T_{j+1}-T_j$.

The diagrams according to FIGS. 7 and 8 perform a continuous tracking of the average adhesion peak μ, continuously adapting to the change in adhesion conditions, similarly to what was achieved with the diagram according to FIG. 6. The latter allows rapid and accurate tracking of the condition $$\frac{d\mu}{d\delta} = 0,$$

but requires the use of a certain number of computations in real time.

The diagram according to FIG. 8 greatly reduces the number of computations necessary, but also reduces the tracking speed of the condition $$\frac{d\mu}{d\delta} = 0.$$

The diagram according to FIG. 7 has features intermediate between those of the diagrams according to FIGS. 6 and 8.

Therefore, the two expressions (2), (3) provided above always allow a very reliable value of the vehicle's speed $V_v$ to be provided, even in very degraded adhesion conditions.

If it is desired to further increase the accuracy of the tracking of the train's speed, it is sufficient to compute the error with respect to values of $$\frac{d\mu}{d\delta} > 0,$$

i.e., on the left side of the curve illustrated in FIG. 5B, at the expense of the applied torque value, which will prove to be lower than the maximum peak as a function of the increase of the applied reference value $$\frac{d\mu}{d\delta}.$$

Naturally, without altering the principle of the inventive subject matter, the embodiments and the details of implementation may vary widely with respect to those described and illustrated purely by way of non-limiting example, without thereby departing from the scope of the inventive subject matter as defined in the appended claims.

In one or more embodiments, a method is provided for calculating or estimating a speed of a vehicle. The method includes generating speed signals indicating an angular speed (ω) of wheels of an axle of the vehicle. The method also includes estimating, via a control system that includes one or more processors, as a function of said angular speed (ω), a value of adhesion (μ) of a contact area of the wheels of said axle to a route, and calculating a value of slip (δ) of the wheels of said axle. The method includes generating signals representative of a derivative (dμ/dδ) of said adhesion (μ) as a function of the slip (δ) of the wheels of said axle, and calculating an error signal ($e(T_{j+1})$) as a difference between a value of said derivative (dμ/dδ) and a predetermined reference value. The method includes generating, via an adaptive filter that implements a Least Mean Square (LMS) algorithm, a driving signal ($C(T_{j+1})$) based on said derivative (dμ/dδ). The LMS algorithm is continuously adapted based on the error signal to reduce and keep the error signal substantially at zero. The method also includes applying said driving signal ($C(T_{j+1})$) to a torque control module to control a torque exerted on said axle or the wheels of said axle.

Optionally, said driving signal ($C(T_{j+1})$) is generated by integration over time of the error signal ($e(T_{j+1})$).

Optionally, said driving signal ($C(T_{j+1})$) is generated by integration over time a difference between (i) a sign of the derivative $$\left(\frac{d\mu}{d\delta}\right)$$

of the adhesion (μ) as a function of the slip (δ) and (ii) the predetermined reference value.

Optionally, the predetermined reference value is equal to or greater than zero.

Optionally, the at least one of the calculating or the estimating is performed during a braking condition of the vehicle.

Optionally, at least one of the calculating or the estimating is performed during a traction condition of the vehicle.

Optionally, the method further includes computing the speed of the vehicle as a linear speed at which said axle advances.

Optionally, the vehicle is a railway vehicle and the route includes rails.

In one or more embodiments, a method for calculating or estimating a speed of a vehicle is provided. The method includes generating speed signals indicating an angular speed of wheels of an axle of the vehicle. The method includes estimating, via a control system that includes one or more processors, as a function of said angular speed, a value of adhesion of a contact area of the wheels of said axle to a route, and calculating a value of slip of the wheels of said axle. The method also includes generating signals representative of a derivative of said adhesion as a function of the slip of the wheels of said axle, and calculating an error signal as a difference between a value of said derivative and a predetermined reference value. The method includes generating, via an adaptive filter that implements a Least Mean Square (LMS) algorithm, a driving signal based on said derivative. The LMS algorithm is continuously adapted based on the error signal to reduce and keep the error signal substantially at zero. The method includes applying said driving signal to a torque control module to control a torque exerted on said axle or the wheels of said axle.

Optionally, said predetermined reference value is equal to or greater than zero.

Optionally, at least one of the calculating or the estimating is performed during a braking condition of the vehicle.

Optionally, at least one of the calculating or the estimating is performed during a traction condition of the vehicle.

Optionally, the method further includes computing the speed of the vehicle as a linear speed at which said axle advances.

Optionally, the vehicle is a railway vehicle and the route includes rails.

In one or more embodiments, a control system is provided that includes a control circuit including one or more processors. The control circuit is configured to receive speed signals indicating an angular speed of wheels of an axle of a vehicle. The control circuit is configured to estimate, as a function of said angular speed, a value of adhesion of a contact area of the wheels of said axle to a route, and calculate a value of slip of the wheels of said axle. The control circuit is also configured to generate signals representative of a derivative of said adhesion as a function of the slip of the wheels of said axle, and to calculate an error signal as a difference between a value of said derivative and a predetermined reference value. The control circuit includes an adaptive filter that implements a Least Mean Square (LMS) algorithm. The adaptive filter is configured to generate a driving signal based on said derivative. The LMS algorithm is continuously adapted based on the error signal to reduce and keep the error signal substantially at zero. The control circuit is further configured to control a torque exerted on said axle or the wheels of said axle based on said driving signal.

Optionally, the control circuit is further configured to compute the speed of the vehicle as a linear speed at which said axle advance.

Optionally, said predetermined reference value is equal to zero.

Optionally, the control circuit is configured to calculate the value of the slip during both a braking condition and a traction condition of the vehicle.

Optionally, the control circuit is configured to control the torque exerted on said axle or the wheels of said axle by generating a control signal to one or more of a friction brake assembly or a traction motor associated with the axle.

Optionally, the vehicle is a railway vehicle and the route includes rails.

The various components and modules described herein may be implemented as part of one or more computers, computing systems, or processors. The computer, computing system, or processor may include a microprocessor. The computer or processor may also include a memory. The memory may include random access memory (RAM) and read only memory (ROM). The computer or processor further may include a storage system or device, which may be a hard disk drive or a removable storage drive such as a floppy or other removable disk drive, optical disk drive, and the like. The storage system may also be other similar means for loading computer programs or other instructions into the computer or processor. The instructions may be stored on a tangible and/or non-transitory computer readable storage medium coupled to one or more servers.

As used herein, the term "computer" or "computing system" or "controller" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "computing system" or "controller."

The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings without departing from its scope. While the dimensions and types of materials described herein are intended to define the parameters, they are by no means limiting and are exemplary embodiments. Many other embodiments will be apparent to one of ordinary skill in the art upon reviewing the above description. As used herein, the terms "including," "includes," and "in which" are used as the plain-English equivalents of the respective terms "comprising," "comprises," and "wherein." Moreover, the terms "first," "second," and "third," etc. are used merely as labels, and are not intended to impose numerical requirements on their objects.

This written description uses examples to disclose several embodiments, and also to enable any person skilled in the art to practice the embodiments, including making and using any devices or systems and performing any incorporated methods. The patentable scope may include other examples that occur to one of ordinary skill in the art. Such other examples are intended to be within the scope of the invention if they have structural elements that do not differ from the literal language herein, or if they include equivalent structural elements with insubstantial differences from the literal languages used herein.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle system or consist, without departing from the spirit and scope of the embodiments described herein, it is intended that all of the subject matter of the above description or shown in the accompanying drawings shall be interpreted merely as examples illustrating the inventive subject matter herein and shall not be construed as limiting.

What is claimed is:

1. A method comprising:
generating speed signals indicating an angular speed of wheels of an axle of a vehicle;
estimating, via a control system that includes one or more processors, as a function of said angular speed, a value of adhesion of a contact area of the wheels of said axle to a route, and calculating a value of slip of the wheels of said axle;
generating signals representative of a derivative value of said adhesion as a function of the slip of the wheels of said axle;
calculating an error signal as a difference between the derivative value and a predetermined reference value;
inputting the derivative value into a Least Mean Square (LMS) algorithm that is implemented by an adaptive filter;
generating, via the adaptive filter that implements the LMS algorithm, a driving signal based on said derivative value, wherein the LMS algorithm is continuously adapted based on the error signal to reduce and keep the error signal substantially at zero; and
applying said driving signal to a torque control module to control a torque exerted on said axle or the wheels of said axle.

2. The method of claim 1, wherein said predetermined reference value is equal to or greater than zero.

3. The method of claim 1, wherein at least one of the calculating or the estimating is performed during a braking condition of the vehicle.

4. The method of claim 1, wherein at least one of the calculating or the estimating is performed during a traction condition of the vehicle.

5. The method of claim 1, further comprising computing a speed of the vehicle as a linear speed at which said axle advances.

6. The method of claim 1, wherein the vehicle is a railway vehicle and the route includes rails.

7. The method of claim 1, wherein the LMS algorithm is continuously adapted based on the error signal such that a first driving signal is generated by the adaptive filter in response to inputting a first derivative value into the LMS algorithm at a first time, and a second driving signal, different from the first driving signal, is generated by the adaptive filter in response to inputting the first derivative value into the LMS algorithm at a second time.

8. A control system comprising:
a control circuit including one or more processors, the control circuit configured to receive speed signals indicating an angular speed of wheels of an axle of a vehicle, the control circuit configured to estimate, as a function of said angular speed, a value of adhesion of a contact area of the wheels of said axle to a route, and calculate a value of slip of the wheels of said axle;
the control circuit configured to generate signals representative of a derivative value of said adhesion as a function of the slip of the wheels of said axle, and to calculate an error signal as a difference between the derivative value and a predetermined reference value;
the control circuit comprising an adaptive filter that implements a Least Mean Square (LMS) algorithm, the control circuit configured to input the derivative value into the LMS algorithm, the adaptive filter configured to generate a driving signal based on said derivative value that is input, wherein the control circuit is configured to continuously adapt the LMS algorithm based on the error signal to reduce and keep the error signal substantially at zero;
the control circuit further configured to control a torque exerted on said axle or the wheels of said axle based on said driving signal.

9. The control system of claim 8, wherein the control circuit is further configured to compute a speed of the vehicle as a linear speed at which said axle advances.

10. The control system of claim 8, wherein said predetermined reference value is equal to zero.

11. The control system of claim 8, wherein the control circuit is configured to calculate the value of the slip during both a braking condition and a traction condition of the vehicle.

12. The control system of claim 8, wherein the control circuit is configured to control the torque exerted on said axle or the wheels of said axle by generating a control signal to one or more of a friction brake assembly or a traction motor associated with the axle.

13. The control system of claim 8, wherein the vehicle is a railway vehicle and the route includes rails.

14. The control system of claim 8, wherein the control circuit is configured to continuously adapt the LMS algorithm based on the error signal such that the adaptive filter generates a first driving signal in response to the control circuit inputting a first derivative value into the LMS algorithm at a first time, and the adaptive filter generates a second driving signal, different from the first driving signal, in response to the control circuit inputting the first derivative value into the LMS algorithm at a second time.

* * * * *